UNITED STATES PATENT OFFICE.

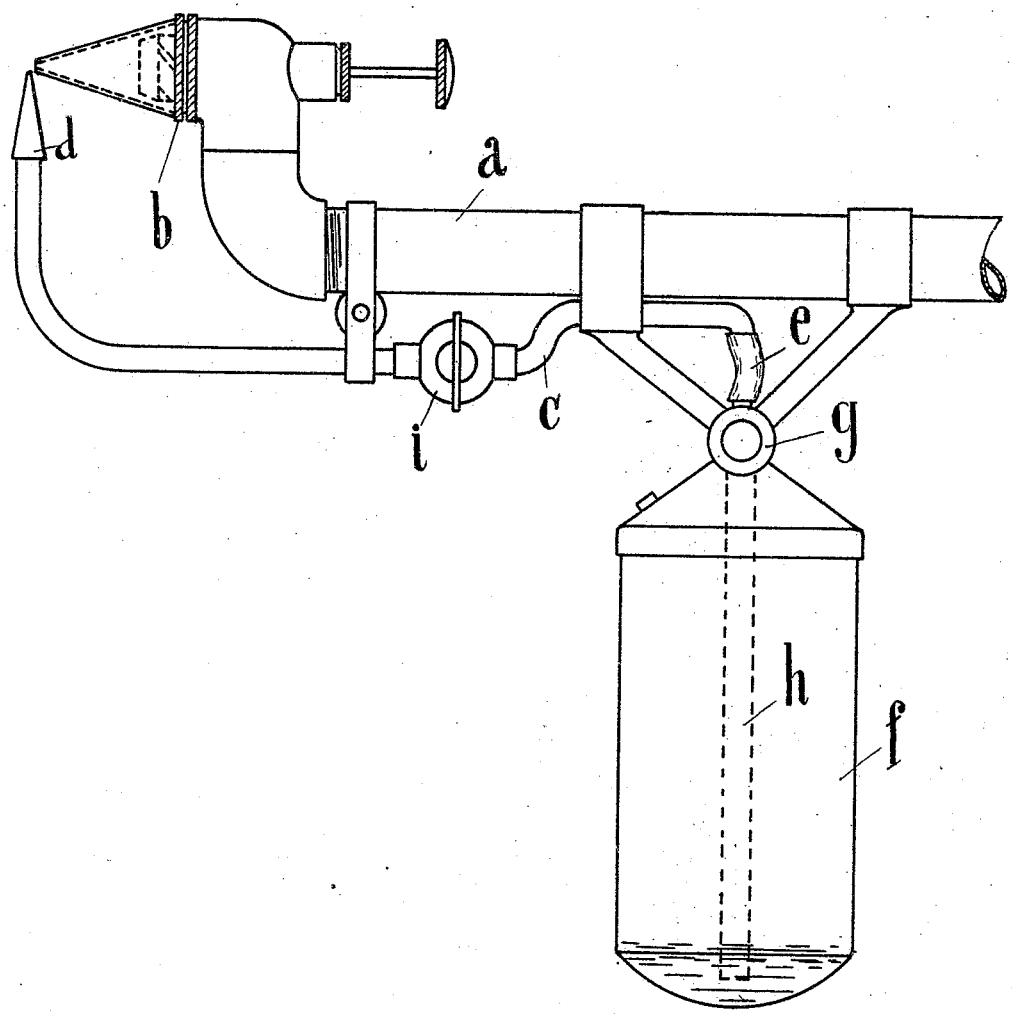

HANS MIKOREY, OF SCHÖNEBERG, NEAR BERLIN, GERMANY, ASSIGNOR TO THE FIRM OF MINIMAX CONSOLIDATED LIMITED, OF BERLIN, GERMANY.

SPRAYER.

955,418.  Specification of Letters Patent.  Patented Apr. 19, 1910.

Application filed February 24, 1908. Serial No. 417,341.

*To all whom it may concern:*

Be it known that I, HANS MIKOREY, a subject of the German Emperor, a resident of 13 Wartburgstrasse, in the city of Schöneberg, near Berlin, Kingdom of Prussia and German Empire, have invented a certain new and useful Sprayer, of which the following is a specification.

This invention has reference to a spraying or dispersing apparatus which is particularly intended for disinfecting purposes. As the operating agent for the disperser or sprayer water under pressure is employed.

The sprayer or disperser comprises a conduit pipe for water under pressure, and a second pipe which leads to a receptacle or tank containing the disinfecting agent. This receptacle is rockingly mounted in the frame of the sprayer, so that it retains its vertical position in any situation of the sprayer, allowing at the same time the sucking off even of the last traces of disinfecting agent from the container or receptacle. Both the pipe for conducting the water and the pipe for the admission of the disinfecting agent are provided with nozzles. Both nozzles are arranged in the well known manner at an angle to each other, in order to effect the sucking off of the disinfecting agent. The nozzle connected to the water conducting pipe is preferably made in such a manner, as to be used as a sprinkling nozzle.

An embodiment of my invention is shown by way of example on the accompanying drawing.

In the drawing:—$a$ is the admission pipe for water under pressure. In the embodiment of my invention, herein shown, this pipe terminates in a sprinkling nozzle $b$. Below the pipe $a$ another pipe $c$ is arranged which terminates likewise in a nozzle $d$, and the rear end of which is connected by means of a flexible conduit $e$ to the container $f$ for the disinfecting agent. The container $f$ is rotatably journaled in any suitable manner in the frame of the sprayer at $g$, so that it will always retain its vertical position when the device is operated, as above explained.

The device operates so that the disinfecting agent is sucked up from the container $f$ and through the nozzle $d$ and the pipe $c$ by means of the disintegrated jet of water issuing from the nozzle $b$, the said disinfecting agent being at the same time very finely subdivided and mixed with the sprayed jet of water. The quantity of disinfecting agent admitted to the nozzle $d$ can be controlled by means of a cock $i$ or the like.

What I claim and desire to secure by Letters Patent of the United States is:—

The combination, in a spraying or dispersing apparatus, of a conduit pipe adapted to be connected to a water supply, a spraying nozzle at the ends of said conduit pipe, a liquid container pivotally journaled on said conduit pipe, liquid discharging means connected to said container, and a nozzle at the end of said liquid discharging means, said nozzle being arranged in proximity to the spraying nozzle, so as to mix the dispersed jet of liquid with another liquid in a state of very fine subdivision, substantially as set forth.

In witness whereof I have hereunto signed my name this 7th day of February 1908, in the presence of two subscribing witnesses.

HANS MIKOREY.

Witnesses:
 WOLDEMAR HAUPT,
 HENRY HASPER.